United States Patent [19]
Chuman et al.

[11] Patent Number: 5,986,390
[45] Date of Patent: Nov. 16, 1999

[54] ELECTRON EMISSION DEVICE HAVING PEAK INTENSITY RATIO CHARACTERISTIC OF RAMAN SPECTRUM FOR FOLD RING OF $SIO_2$

[75] Inventors: Takashi Chuman, Tsurugashima; Takamasa Yoshikawa, Saitama, both of Japan

[73] Assignee: Pioneer Electronic Corporation, Tokyo, Japan

[21] Appl. No.: 09/033,980

[22] Filed: Mar. 3, 1998

[30] Foreign Application Priority Data

Mar. 10, 1997 [JP] Japan ..................................... 9-118691
Jun. 12, 1997 [JP] Japan ..................................... 9-171004

[51] Int. Cl.$^6$ ....................................................... H01J 1/02
[52] U.S. Cl. ..................... 313/310; 313/346 R; 313/351; 313/352; 313/495; 313/309
[58] Field of Search ............................... 313/310, 346 R, 313/351, 352, 495, 309

[56] References Cited

U.S. PATENT DOCUMENTS

| | | | |
|---|---|---|---|
| 3,944,946 | 3/1976 | Prasad et al. ............................... | 331/94 |
| 4,059,813 | 11/1977 | Leiby, Jr. et al. ......................... | 331/94 |
| 5,448,133 | 9/1995 | Ise ........................................... | 313/497 |
| 5,777,427 | 7/1998 | Tanaka et al. ............................. | 313/309 |
| 5,801,486 | 9/1998 | Johnson et al. ........................... | 313/495 |
| 5,811,916 | 9/1998 | Jin et al. ................................... | 313/310 |
| 5,817,421 | 10/1998 | Oishi et al. ............................... | 428/446 |

OTHER PUBLICATIONS

"Journal of Vacuum Science and Technology: Part B", vol. 11, No. 2, Mar. 1, 1993, pp. 514–517.
"The Radio and Electronic Engineer", vol. 33, Jun. 1967, pp. 347–351.
Patent Abstracts of Japan, JP 07 065710 A (Hitachi Ltd.) Mar. 10, 1995.

*Primary Examiner*—Sandra O'Shea
*Assistant Examiner*—Ronald E. DelGizzi
*Attorney, Agent, or Firm*—Sughrue, Mion, Zinn, Macpeak & Seas, PLLC

[57] ABSTRACT

An electron emission device exhibits a high electron emission efficiency. The device includes an electron supply layer of metal or semiconductor, an $SiO_2$ insulator layer formed on the electron supply layer, and a thin-film metal electrode formed on the insulator layer. The peak intensity ratio of a Raman spectrum for 3-fold rings of $SiO_2$ of the insulator layer to 4-fold rings or 5 or more-fold rings thereof is equal to or greater than 20%. When an electric field is applied between the electron supply layer and the thin-film metal electrode, the electron emission device emits electrons.

8 Claims, 6 Drawing Sheets

ELECTRON EMISSION DEVICE HAVING PEAK INTENSITY RATIO CHARACTERISTIC OF RAMAN SPECTRUM FOR FOLD RING OF SIO₂

BACKGROUND OF THE INVENTION

1. Field of the Invention

The present invention relates to an electron emission device and a electron emission display device using the same.

2. Description of Related Art

In field electron emission display apparatuses, an FED (Field Emission Display) is known as a planar emission display device equipped with an array of cold-cathode electron emission sources which do not require cathode heating. The emission principle of, for example, an FED using a spindt type cold cathode is as follows: Its emission principle is like a CRT (Cathode Ray Tube), although this FED has a cathode array different from that of a CRT, that is, electrons are drawn into a vacuum space by means of a gate electrode spaced apart from the cathode, and the electrons are made to impinge upon the fluorescent substance that is coated on a transparent anode, thereby causing light emission.

This field emission source, however, faces a problem of low production yield because the manufacture of the minute spindt type cold cathode is complex and involves many steps.

There also exists an electron emission device with a metal-insulator-metal (MIM) structure as a planar electron source. This electron emission device with a MIM structure has an Al layer as a cathode, an $Al_2O_3$ insulator layer of about 10 nm in film thickness and an Au layer, as an anode, of about 10 nm in film thickness formed in order on the substrate. With this device placed under an opposing electrode in vacuum, when a voltage is applied between the underlying Al layer and the overlying Au layer and an acceleration voltage is applied to the opposing electrode, some of electrons leap out of the overlying Au layer and reach the opposing electrode. Even the electron emission device with the MIM structure does not yet provide a sufficient amount of emitted electrons.

To improve this property of emission, it is considered that there is a necessity to make the $Al_2O_3$ insulator layer thinner by about several nanometers and make the quality of the membranous $Al_2O_3$ insulator layer and the interface between the $Al_2O_3$ insulator layer and the overlying Au layer more uniform.

To provide a thinner and more uniform insulator layer, for example, an attempt has been made to control the formation current by using an anodization thereby to improve the electron emission characteristic, as in the invention described in Japanese Patent Application kokai No. Hei 7-65710.

However, even an electron emission device with a MIM structure which is manufactured by this method ensures an emission current of about $1\times10^{-5}$ A/cm² and an electron emission efficiency of about $1\times10^{-3}$.

SUMMARY OF THE INVENTION

Accordingly, it is an object of the present invention to provide an electron emission device with a high electron emission efficiency and an electron emission display apparatus using the same.

An electron emission device according to the invention comprises:

an electron supply layer of metal or semiconductor;

an insulator layer containing $SiO_2$ as a main component and formed on the electron supply layer; and a thin-film metal electrode formed on the insulator layer, characterized in that a peak intensity ratio of a Raman spectrum for 3-fold rings of $SiO_2$ of the insulator layer to 4-fold rings or 5 or more-fold rings thereof is equal to or greater than 20%, whereby the electron emission device emits electrons when an electric field is applied between the electron supply layer and the thin-film metal electrode.

A display device using an electron emission device according to the invention comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron supply layer of metal or semiconductor, an insulator layer containing $SiO_2$ as a main component and formed on the electron supply layer, and a thin-film metal electrode formed on the insulator layer, wherein a peak intensity ratio of a Raman spectrum for 3-fold rings of $SiO_2$ of the insulator layer to 4-fold rings or 5 or more-fold rings thereof is equal to or greater than 20%.

According to the electron emission device of the invention with the above structure, through-bores are not likely to be produced in the insulator layer because of its large thicknes, which results in improved production yield. As long as the intensity ratio of the Raman spectrum for 3-fold rings of $SiO_2$ of the insulator layer to 4-fold rings or 5 or more-fold rings thereof is equal to or greater than 20%, the emission current of the electron emission device is greater than $1\times10^{-6}$ A/cm² and is approximately $1\times10^{-3}$ A/cm², and the electron emission efficiency obtained is $1\times10^{-1}$. This electron emission device, when in use in a display device, can provide a high luminance, can suppress the consumption of the drive current and the generation of heat from the device, and can reduce a load on the driving circuit.

The electron emission device of the invention is a planar or spot-like electron emission diode, and can serve as a light-emitting diode or a laser diode which emits electromagnetic waves of infrared rays, visible light or ultraviolet rays.

DETAILED DESCRIPTION OF THE PREFERRED EMBODIMENTS

Preferred embodiments according to the present invention will be described in more detail with reference to the accompanying drawings.

Figure 1:
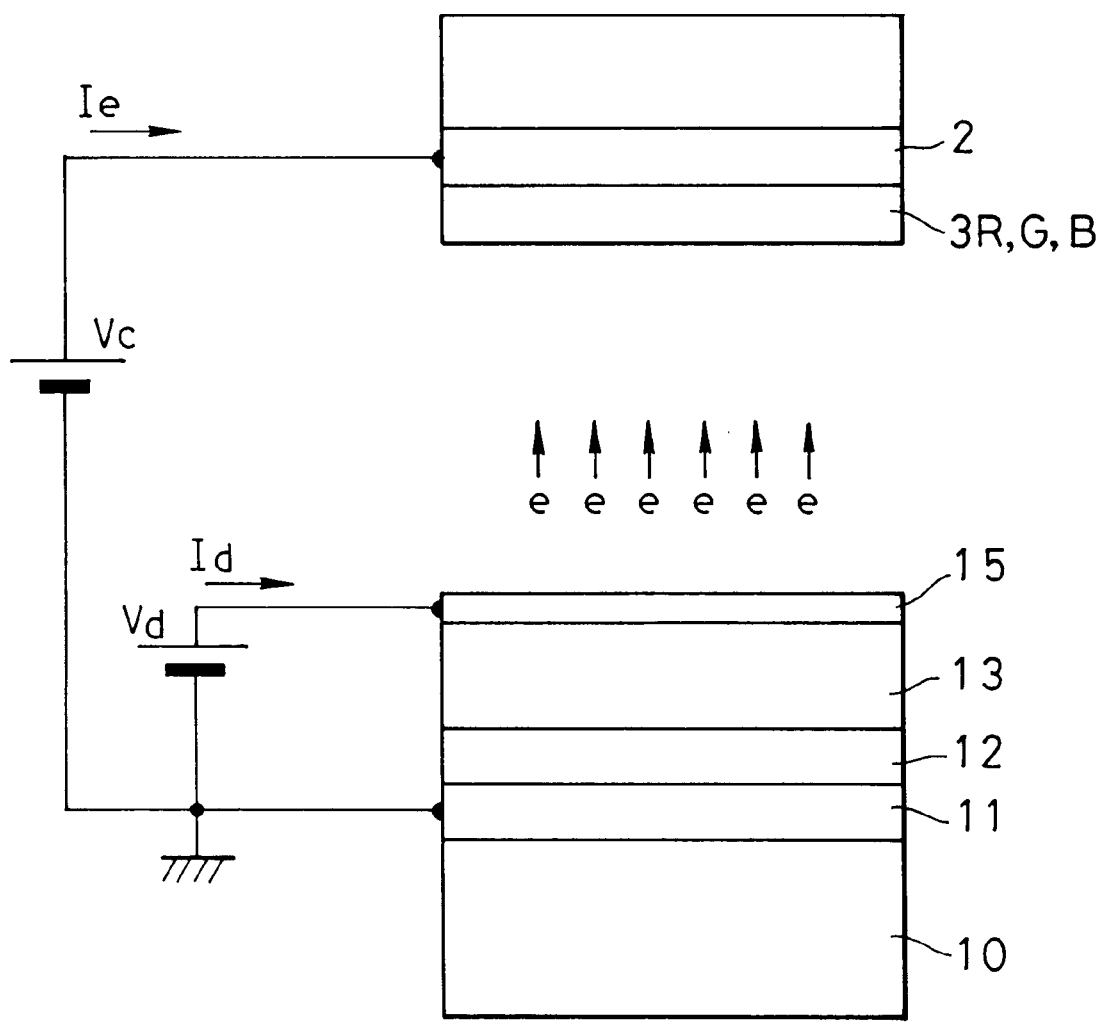
FIG. 1 is a schematic cross-sectional view of an electron emission device according to the invention.

As shown in FIG. 1, an electron emission device embodying the invention includes an ohmic electrode 11 of, for example, Al formed on a device substrate 10, and further includes an electron supply layer 12 of metal or semiconductor such as Si, an insulator layer 13 of $SiO_2$ or the like and a thin-film metal electrode 15 of metal such as Pt facing a vacuum space, which are formed on the device substrate 10 in the described order.

The insulator layer 13 is made of a dielectric substance and has a very large film thickness of 50 nm or greater. The electron emission device can be regarded as a diode of which the thin-film metal electrode 15 at its surface is connected to a positive potential Vd and the back, i.e., ohmic electrode 11 is connected to a ground potential. When the voltage Vd is applied between the ohmic electrode 11 and the thin-film metal electrode 15 to supply electrons into the electron supply layer 12, a diode current Id flows. Since the insulator layer 13 has a high resistance, most of the applied electric field is applied to the insulator layer 13. The electrons travel inside the insulator layer 13 toward the thin-film metal electrode 15. Some of the electrons that reach near the thin-film metal electrode 15 tunnel through the thin-film metal electrode 15, due to the strong electric field, to be discharged out into the vacuum space.

The electrons e (emission current Ie) discharged from the thin-film metal electrode 15 by the tunnel effect are accelerated by a high voltage Vc, which is applied to an opposing collector electrode (transparent electrode) 2, and are collected at the collector electrode 2. If a fluorescent substance is coated on the collector electrode 2, corresponding visible light is emitted.

While Si is particularly effective as a material for the electron supply layer of the electron emission device, an elemental semiconductor or a compound semiconductor of an element of a group IV, a group III–V, a group II–VI or the like, such as a germanium (Ge), silicon carbide (SiC), gallium arsenide (GaAs), indium phosphide (InP), or cadmium selenide (CdSe) can be used as well.

While metals such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu and the like can be used as well.

Silicon oxide $SiO_x$ (wherein subscript x represents an atomic ratio) is effective as the dielectric material of the insulator layer.

Although metals such as Pt, Au, W, Ru and Ir are effective as the material for the thin-film metal electrode 15 on the electron emission side, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and the like can be used as well.

The material for the device substrate 10 may be ceramics such as $Al_2O_3$, $Si_3N_4$ or BN instead of glass.

Although sputtering is particularly effective in forming those layers and the substrate, vacuum deposition method, CVD (Chemical Vapor Deposition), laser aberration method, MBE (Molecular Beam Epitaxy) and ion beam sputtering are also effective.

The electron emission device of the invention was fabricated and its characteristics were examined specifically.

The electron supply layer 12 of silicon (Si) was formed 5000 nm thick, by sputtering, on the electrode surface of the device substrate 10 of glass on which an Al ohmic electrode was formed 300 nm thick by sputtering. A plurality of Si substrates of this type were prepared.

Then, the $SiO_2$ insulator layers 13 was formed on the electron supply layer 12 of the Si substrates by sputtering while changing in turn the film thickness of the insulator layer 13 in a range from 0 nm to 500 nm, thus providing a plurality of $SiO_2$ insulator substrates. The $SiO_2$ insulator layer 13 was formed through a sputtering method by using a gas of Ar, Kr or Xe or a mixture thereof, or a gas mixture essentially consisting of one of those rare gases with $O_2$, $N_2$, $H_2$ or the like mixed therein, under the sputtering conditions of a gas pressure of 0.1 to 100 mTorr, preferably 0.1 to 20 mTorr and the forming rate of 0.1 to 1000 nm/min, preferably 0.5 to 100 nm/min. Although $SiO_2$ was used as the dielectric material of the insulator layer, it was confirmed that impurities such as Al, Fe, Cr, Ni, B, Sb, As, P and Ar of 1 atm % or less were found in the insulator layer as the results of the measurement. The single layer or multilayer structure, the amorphous or crystal phase, the grain size and the atomic ratio of the insulator layer 13 can be controlled by properly altering the sputtering target and sputtering conditions of the sputtering device.

The analysis on the $SiO_2$ insulator layer 13 in this embodiment by X-ray diffraction showed no diffraction intensity Ic at the crystal portion but a halo intensity Ia by the amorphous phase. It can be assumed from this that $SiO_2$ of the insulator layer has the amorphous phase.

Finally, the thin-film metal electrode 15 of Pt was formed 10 nm thick on the surface of the amorphous $SiO_2$ layer of each substrate by sputtering, thus providing a plurality of device substrates.

Meanwhile, transparent substrates were prepared each of which has the ITO collector electrode 2 formed inside a transparent glass substrate 1 and which has a fluorescent layer 3 of a fluorescent substance corresponding to R, G or B color emission formed on each collector electrode by the normal scheme.

Electron emission devices were assembled in each of which the device substrate and the transparent substrate are supported apart from one another by 10 mm in parallel by a spacer in such a way that the thin-film metal electrode 15 faced the collector electrode 2, with the clearance therebetween made to a vacuum of $10^{-7}$ Torr or $10^{-5}$ Pa.

Then, the diode current Id and the emission current Ie corresponding to the thickness of the $SiO_2$ film of each of the acquired plural devices were measured.

Figure 2:
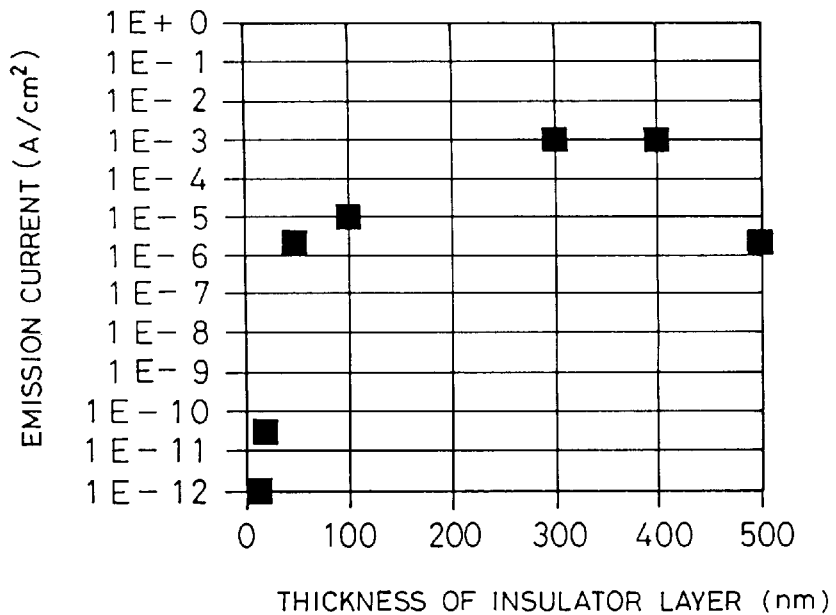
FIG. 2 is a graph showing the dependency of the electron emission current on the film thickness of an $SiO_2$ layer in the electron emission device embodying the invention.
Figure 3:
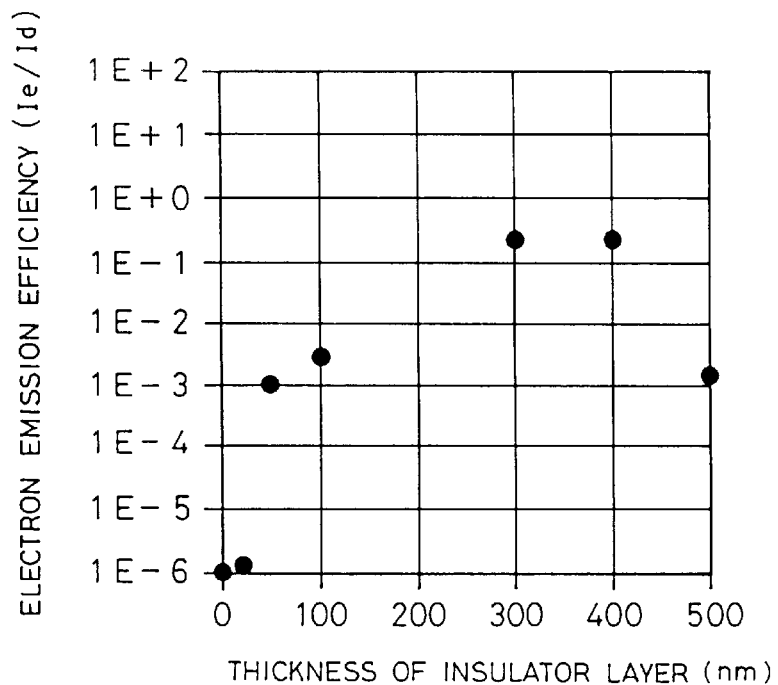
FIG. 3 is a graph showing the dependency of the electron emission efficiency on the film thickness of the $SiO_2$ layer in the electron emission device embodying the invention.

FIGS. 2 and 3 show the relationship between the film thickness of each $SiO_2$ layer and the maximum emission current Ie and the maximum electron emission efficiency (Ie/Id) for each film thickness when Vd of 0 to 200 V was applied to the prepared electron emission devices. As apparent from FIGS. 2 and 3, while the emission current and the electron emission efficiency were saturated from the thickness of 50 nm, the devices whose $SiO_2$ layers had thicknesses of 300 to 400 nm showed the maximum emission current of about $1 \times 10^{-3}$ $A/cm^2$ and the maximum electron emission efficiency of about $1 \times 10^{-1}$.

It is understood from those results that by applying a voltage of 200 V or lower, the emission current of $1 \times 10^{-6}$ $A/cm^2$ or greater and the electron emission efficiency of $1 \times 10^{-3}$ or greater can be acquired from an electron emission device which has an $SiO_2$ dielectric layer 50 nm or greater in thickness, preferably 100 to 400 nm in thickness.

With a voltage of approximately 4 kV applied between the fluorescent-substance coated collector electrode 2 and the thin-film metal electrode 15, a uniform fluorescent pattern corresponding to the shape of the thin-film metal electrode was observed in the devices whose $SiO_2$ layers have thicknesses of 50 nm or greater. This shows that the electron emission from the amorphous $SiO_2$ layer is uniform and has a high linearity, and that those devices can serve as an electron emission diode, or a light-emitting diode or laser diode which emits electromagnetic waves of infrared rays, visible light or ultraviolet rays.

Figure 5:
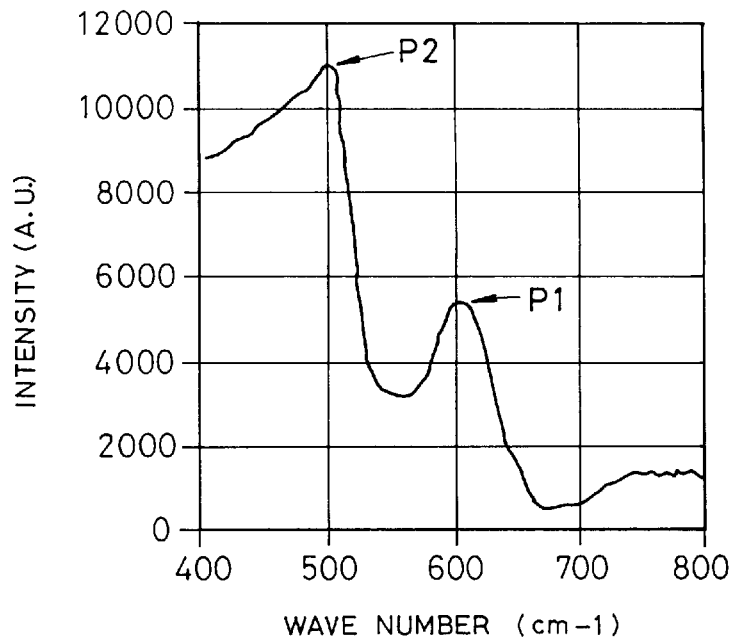
FIG. 5 is a spectrum showing the results of analysis on the insulator layer of the electron emission device of the invention by Raman scattering spectrometry.
Figure 6:
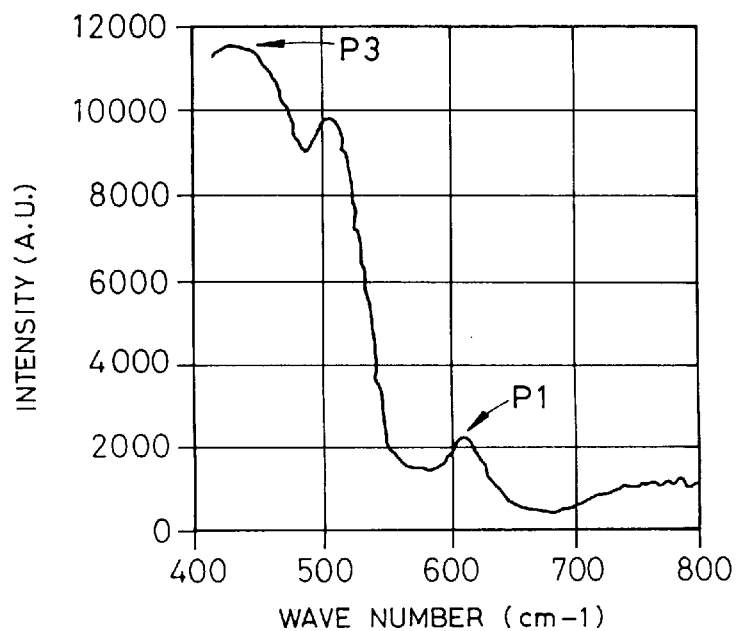
FIG. 6 is a spectrum showing the results of analysis on the insulator layer of the electron emission device of the invention by Raman scattering spectrometry.

Graphs in FIGS. 5 and 6 show the results of analysis on the insulator layer 13 by Raman scattering spectrometry. The Raman scattering spectrometry is a known analysis capable of analyzing the intensities of the individual bands of the 3-fold rings, 4-fold rings and 5 or more-fold rings of $SiO_2$.

FIG. 5 presents a spectrum showing the results of analysis on $SiO_2$ by Raman scattering spectrometry when the insulator layer 13 is formed by sputtering with a 100% Ar gas. In this spectrum, a peak P1 indicates the peak intensity of 3-fold rings of $SiO_2$ and a peak P2 indicates the peak intensity of 4-fold rings of $SiO_2$. The intensity ratio of the peak P1 to the peak P2, P1/P2, is 0.48.

FIG. 6 presents a spectrum showing the results of analysis on $SiO_2$ by Raman scattering spectrometry when the insulator layer 13 is formed by sputtering with a mixture gas of a 60% Ar gas and a 4% $H_2$ gas. In this spectrum, a peak P3 indicates the peak intensity of 5 or more-fold rings of $SiO_2$. The intensity ratio of the peak P1 to the peak P3, P1/P3, is 0.20.

Figure 7:
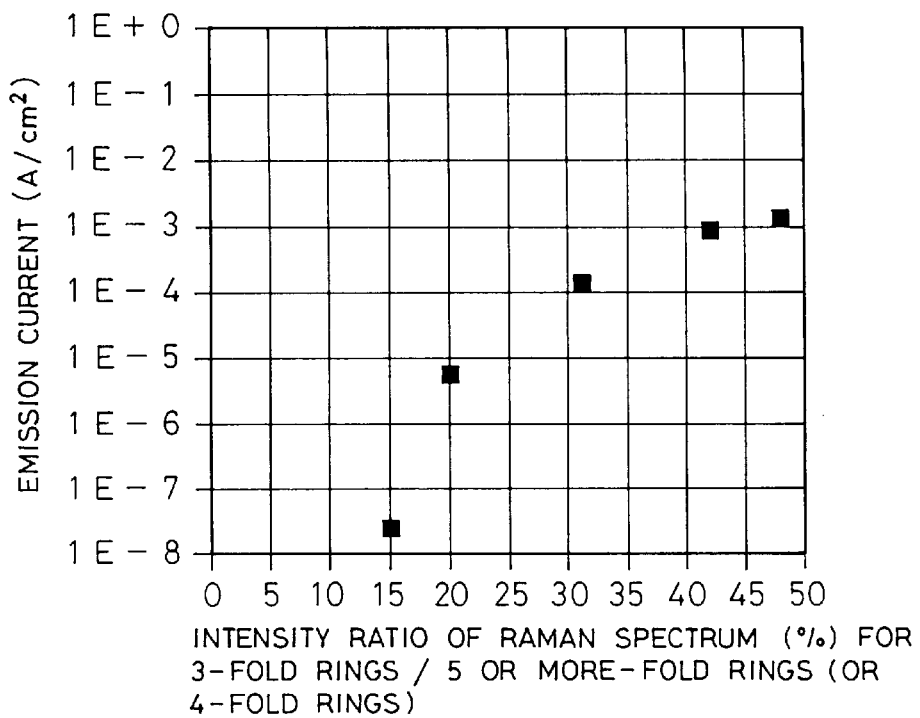
FIG. 7 is a graph illustrating the relationship between the intensity ratio of the Raman spectrum and the electron emission current of the electron emission device according to the invention.
Figure 8:
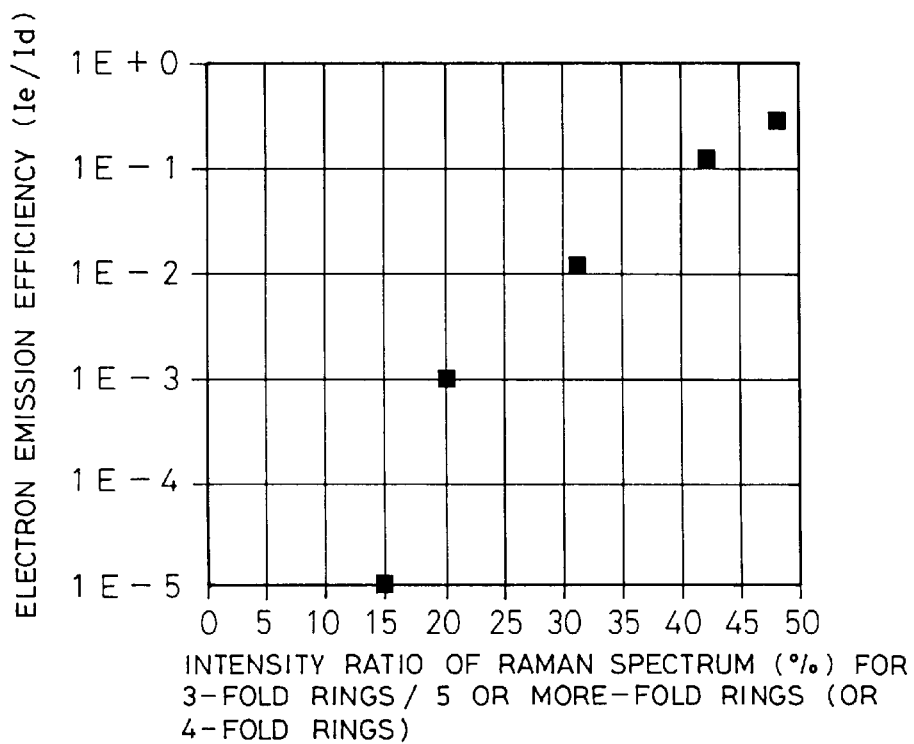
FIG. 8 is a graph depicting the relationship between the intensity ratio of the Raman spectrum and the electron emission efficiency of the electron emission device according to the invention.

Graphs in FIGS. 7 and 8 respectively show the relationship between the intensity ratios of the individual insulator layers 13 with different intensity ratios, which were prepared by sputtering by varying the mixing ratio of Ar to $H_2$ in the sputtering gas, and the emission current and the relationship between the intensity ratios and the electron emission efficiency. Those graphs show the emission current exceeding $1 \times 10^{-6}$ $A/cm^2$ and a considerably high electron emission efficiency of greater than $1 \times 10^{-3}$ when the intensity ratio of the Raman spectrum is equal to or greater than 20%.

Figure 4:
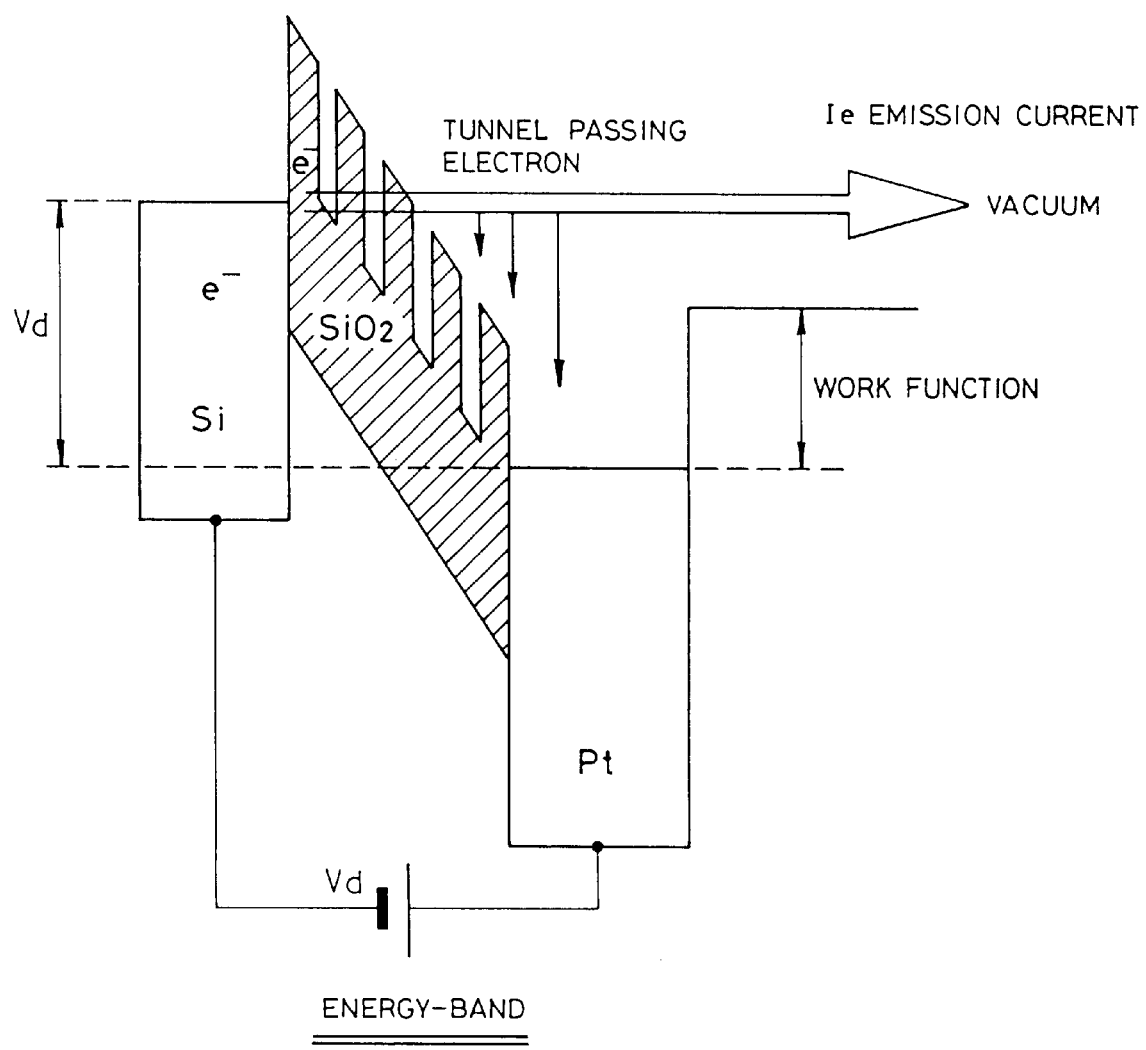
FIG. 4 is a diagram for explaining the operation of the electron emission device of the invention.

The peculiar phenomenon in that the tunneling current flows through the insulator layer having a thickness of 50 nm or greater seems to be originated from the insulator layer's intensity ratio of the Raman spectrum for 3-fold rings of $SiO_2$ of the insulator layer to 4-fold rings or 5 or more-fold rings thereof being equal to or greater than 20%. As shown in FIG. 4, while $SiO_2$ is an insulator by nature, 3-fold rings of $SiO_2$ in the insulator layer have a high energy and some stresses appear, so that if the amount of 3-fold rings is large, multiple bands with a low potential appear as in the case where crystal defects are produced. It is assumed that electrons tunnel through one low-potential band after another, and thus pass through the insulator layer of 50 nm or greater in thickness as a consequence.

If the intensity ratio of the Raman spectrum for 3-fold rings of $SiO_2$ of the insulator layer to 4-fold rings or 5 or more-fold rings thereof is equal to or greater than 20%, the insulator layer 13 can be made equal to or greater than 50 nm, which makes it difficult to produce through holes and improves the production yield. The emission current of the electron emission device goes beyond $1 \times 10^{-6}$ $A/cm^2$ and reaches approximately $1 \times 10^{-3}$ $A/cm^2$ as shown in FIG. 7 and, the electron emission efficiency obtained $1 \times 10^{-3}$ reaches $1 \times 10^{-1}$ as shown in FIG. 8. Therefore, this electron emission device, when in use in a display device, can ensure high luminance, can suppress the consumption of the drive current and heat generation from the device, and can reduce a burden on the driving circuit.

Figure 9:
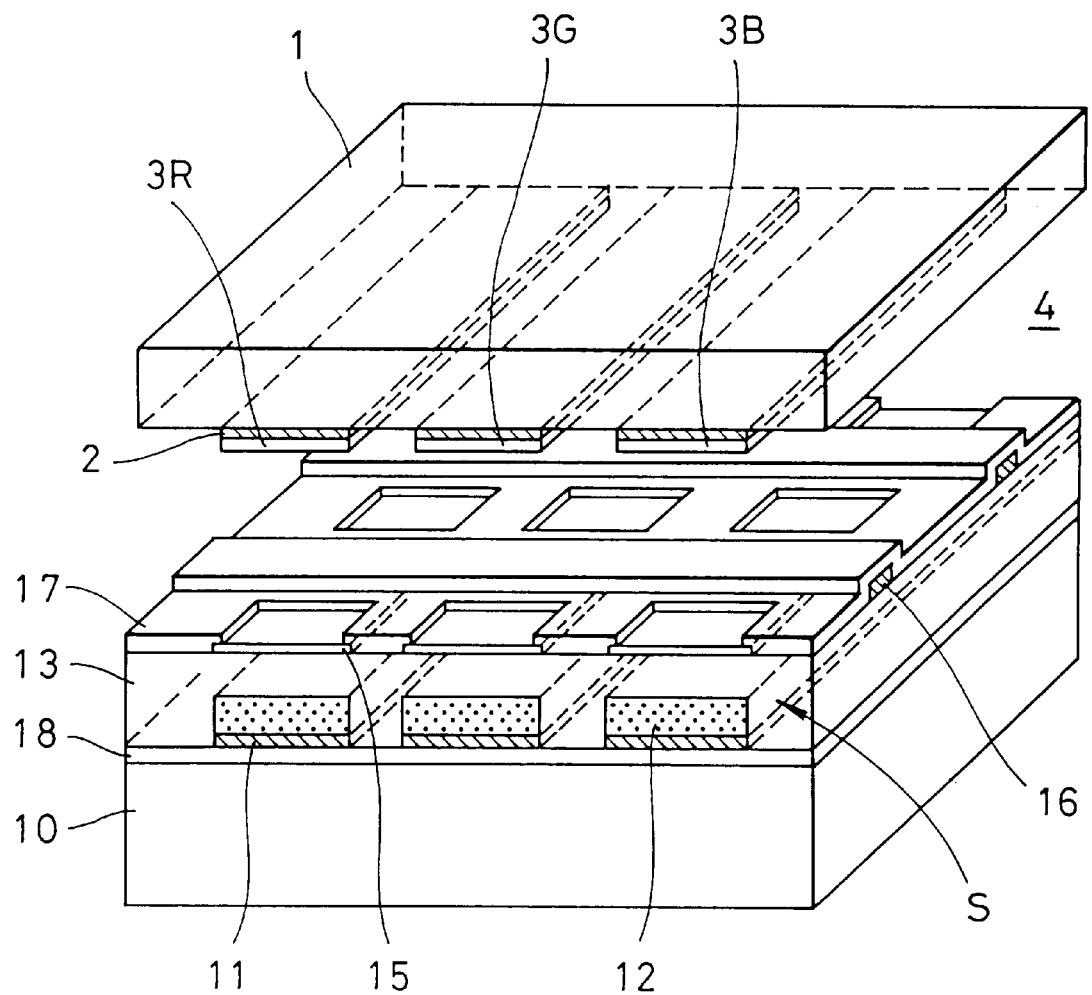
FIG. 9 is a schematic perspective view showing an electron emission display device according to one embodiment of the invention.

FIG. 9 shows an electron emission display device according to one embodiment of the invention. This embodiment comprises a pair of the transparent substrate 1 and the device substrate 10, which face each other with a vacuum space 4 in between. In the illustrated electron emission display apparatus, a plurality of transparent collector electrodes 2 of, for example, an indium tin oxide (so-called ITO), tin oxide (SnO), zinc oxide (ZnO) or the like, are formed in parallel on the inner surface of the transparent glass substrate 1 or the display surface (which faces the back substrate 10). The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively. Therefore, fluorescent layers 3R, 3G and 3B of fluorescent substances corresponding to R, G and B are respectively formed on the three collector electrodes 2 in such a way as to face the vacuum space 4.

A plurality of ohmic electrodes 11 are formed in parallel on the inner surface of the device substrate 10 of glass or the like which faces the transparent glass substrate 1 with the vacuum space 4 in between (i. e., said inner surface faces the transparent glass substrate 1) via an auxiliary insulator layer 18. The auxiliary insulator layer 18 is comprised of an insulator such as $SiO_2$, $SiN_x$, $Al_2O_3$ or AlN, and serves to prevent an adverse influence of the device substrate 10 on the device (such as elution of an impurity such as an alkaline component or a roughened substrate surface). A plurality of electron emission devices S are formed on the ohmic electrodes 11. In order to electrically connect thin-film metal electrodes 15 to each other, a plurality of bus electrodes 16 are formed on parts of the thin-film metal electrodes 15, extending in parallel to one another and perpendicular to the ohmic electrodes 11. Each electron emission device S comprises the electron supply layer 12, the insulator layer 13 and the thin-film metal electrode 15 which are formed in order on the associated ohmic electrode 11. The thin-film metal electrodes 15 face the vacuum space 4. A second auxiliary insulator layer 17 with openings is formed to separate the surfaces of the thin-film metal electrodes 15 into a plurality of electron emission regions. This second auxiliary insulator layer 17 covers the bus electrodes 16 to prevent unnecessary short-circuiting.

The material for the ohmic electrodes 11 is Au, Pt, Al, W or the like which is generally used for the wires of an IC, and has a uniform thickness for supplying substantially the same current to the individual devices.

While silicon (Si) is one material for the electron supply layer 12, it is not restrictive for the electron supply layer of the invention and other semiconductors or metals of any of amorphous, polycrystal and monocrystal can be used as well.

From the principle of electron emission, it is better that the material for the thin-film metal electrode 15 has a lower work function o and is thinner. To increase the electron emission efficiency, the material for the thin-film metal electrode 15 should be a metal of the group I or group II in the periodic table; for example, Cs, Rb, Li, Sr, Mg, Ba, Ca and the like are effective and alloys of those elements may be used as well. To make the thin-film metal electrode 15 very thin, the material for the thin-film metal electrode 15 should be a chemically stable metal with a high conductivity; for example, single substances of Au, Pt, Lu, Ag and Cu or alloys thereof are desirable. It is effective to coat or dope a metal with a low work function as described above on or in those metals.

The material for the bus electrodes 16 can be Au, Pt, Al or the like which is generally used for the wires of an IC, and should have a thickness enough to supply substantially the same potential to the individual devices, adequately of 0.1 to 50 μm.

A simple matrix system or an active matrix system may be employed as the driving system for the display device of the invention.

The electron emission device of the invention can be adapted to a light-emitting source for a pixel bulb, an electron emission source for an electron microscope and a fast device such as a vacuum microelectronics device, and can serve as a planar or spot-like electron emission diode, a light-emitting diode or a laser diode which emits electromagnetic waves of infrared rays, visible light or ultraviolet rays.

What is claimed is:

1. An electron emission device comprising:
   an electron supply layer made of semiconductor material;
   an insulator layer consisting essentially of silicon oxide and formed as a contiguous layer with and on said electron supply layer; and
   a thin-film metal electrode formed as a contiguous layer with and on said insulator layer,
   wherein, when said insulator layer is analyzed by Raman scattering spectrometry, which analyzes intensities of individual bands of fold rings of $SiO_2$, said silicon oxide in said insulator layer is characterized by a Raman spectrum indicating that a peak intensity ratio for 3-fold rings of $SiO_2$ to at least 4-fold rings of $SiO_2$ is at least 20%, whereby said electron emission device emits electrons when an electric field is applied between said electron supply layer and said thin-film metal electrode.

2. An electron emission display device comprising:
   a pair of first and second substrates facing each other with a vacuum space in between;
   a plurality of electron emission devices provided on said first substrate;
   a collector electrode provided on said second substrate; and
   a fluorescent layer formed on said collector electrode,
   wherein each of said electron emission devices comprises an electron supply layer made of semiconductor material, an insulator layer consisting essentially of silicon oxide and formed as a continuous layer with and on said electron supply layer, and a thin-film metal electrode formed as a contiguous layer with and on said insulator layer,
   wherein, when said insulator layer is analyzed by Raman scattering spectrometry, which analyzes intensities of individual bands of fold rings of $SiO_2$, said silicon oxide in said insulator layer is characterized by a Raman spectrum indicating that a peak intensity ratio for 3-fold rings of $SiO_2$ to at least 4-fold rings of $SiO_2$ is at least 20%.

3. The electron emission device according to claim 1, wherein said insulator layer is formed by sputtering.

4. The electron emission device according to claim 1, wherein the insulator layer has a thickness of at least 50 nm.

5. The electron emission device according to claim 2, wherein the insulator layer is formed by sputtering.

6. The electron emission display device according to claim 2, wherein the insulator layer has a thickness of at least 50 nm.

7. An electron emission device comprising:
   an electron supply layer of semiconductor material;
   an insulator layer consisting essentially of silicon oxide and formed on an entire surface of said electron supply layer; and
   a thin-film metal electrode formed on an entire surface of said insulator layer,
   wherein, when the insulator layer is analyzed by Raman scattering spectrometry, which analyzes intensities of individual bands of fold rings of $SiO_2$, said silicon oxide in said insulator layer is characterized by a Raman spectrum indicating that a peak intensity ratio for 3-fold rings of $SiO_2$ to at least 4-fold rings of $SiO_2$ is at least 20%, whereby said electron emission device emits electrons when an electric field is applied between said electron supply layer and said thin-film metal electrode.

8. An electron emission display device comprising:
   a pair of first and second substrates facing each other with a vacuum space in between;
   a plurality of electron emission devices provided on said first substrate;
   a collector electrode provided on said second substrate; and
   a fluorescent layer formed on said collector electrode,
   wherein each of said electron emission devices comprises an electron supply layer of semiconductor material, an insulator layer consisting essentially of silicon oxide and formed on an entire surface of said electron supply layer, and a thin-film metal electrode formed on an entire surface of said insulator layer,
   wherein, when the insulator layer is analyzed by Raman scattering spectrometry, which analyzes intensities of individual bands of fold rings of $SiO_2$, said silicon oxide in said insulator layer is characterized by a Raman spectrum indicating that a peak intensity ratio for 3-fold rings of $SiO_2$ to at least 4-fold rings of $SiO_2$ is at least 20%.

* * * * *